(No Model.)
W. E. TERRY & E. K. HANLEY.
CUFF HOLDER.
No. 407,705. Patented July 23, 1889.
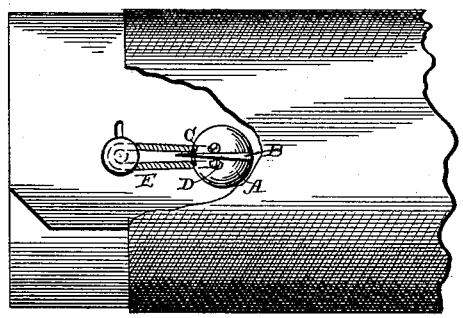
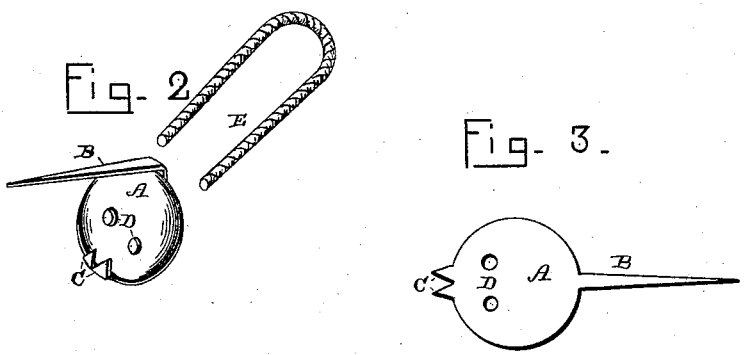
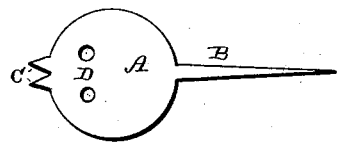
Witnesses:
E. P. Ellis,
Allen S. Pattison
Inventors
Wm. E. Terry,
Edwin K. Hanley,
per J. A. Lehmann, atty

UNITED STATES PATENT OFFICE.

WILLIAM E. TERRY AND EDWIN K. HANLEY, OF ELMIRA, NEW YORK.

CUFF-HOLDER.

SPECIFICATION forming part of Letters Patent No. 407,705, dated July 23, 1889.

Application filed March 8, 1889. Serial No. 302,443. (No model.)

*To all whom it may concern:*

Be it known that we, WILLIAM E. TERRY and EDWIN K. HANLEY, of Elmira, in the county of Chemung and State of New York, have invented certain new and useful Improvements in Cuff-Holders; and we do hereby declare the following to be a full, clear, and exact description of the invention, such as will enable others skilled in the art to which it pertains to make and use it, reference being had to the accompanying drawings, which form part of this specification.

Our invention relates to an improvement in cuff-holders; and it consists of a metal plate provided with an arm at its top, perforations in its body, and teeth in its opposite end, and a rubber or string or other suitable material secured thereto in the form of a loop, all of which will be more fully described hereinafter.

The object of our invention is to produce a simple cuff-holder especially adapted for ladies' use, and which can be secured to and detached from the lining of the sleeve easily and quickly.

Figure 1 is a plan view of a sleeve and cuff placed in position therein, the sleeve being broken away so as to show the holder. Fig. 2 is a detached perspective of the plate, the rubber or cord loop being shown detached ready to be secured thereto. Fig. 3 is a plan view of the blank from which the plate is formed.

A represents a thin metallic plate, which is preferably, though not necessarily, circular in form. Preferably formed as a part of this plate is the sharp pin or arm B, of any suitable length. Just opposite this arm B, and preferably formed as a part of the plate, are one or more teeth C, which are bent upward at right angles to the plate. Formed in the plate at any suitable points are the openings D, through which the inner ends of the rubber or other cord E is passed, thus forming a loop. The inner ends of the cord are knotted after they have been passed through the apertures, so as to prevent them from being drawn outward. The plate is secured to the lining of the sleeve by running the arm B through it parallel with the length of the sleeve. The teeth or projections C are then forced into the lining, so as to prevent the plate from working back into the sleeve, pulling the arm B out of the lining, and thus allowing the plate to become detached. The plate is made of spring metal, so that after the arm or pin has been pushed through the lining by the springing of the pin or arm down on or between the teeth it will force them into the lining, and the arm will remain in this position. The plate, after it has been secured to the lining of the sleeve, is designed to remain there, ready to have the loop formed by the cord slipped over the button and around its shank, as shown in Fig. 1.

When the cord has become worn out and needs replacing, the above construction enables it to be replaced without the metal plate being removed from the sleeve. The plate proper will be pulled down in the position shown in Fig. 2, leaving the arm in the lining. In this position the ends of the cord may be passed through the apertures in the plate and knotted. The plate is then forced upward again until the teeth C engage the lining of the sleeve, as in the first place, when the holder is again ready to have the loop placed around the shank of the cuff-button.

The holder consisting of the plate A, which can be stamped from sheet metal, and the cord E, it will be seen, can be produced very cheaply.

Having thus described our invention, we claim—

A cuff-holder adapted to be secured to the lining of a sleeve, consisting of a plate having an arm or pin projecting forward parallel with its surface, with teeth opposite the arm extending at right angles to the surface of the plate to prevent the holder working up the sleeve, the plate having apertures and a cord having its ends passed through apertures and secured therein so as to form a loop, for the purpose substantially as shown and described.

In testimony whereof we affix our signatures in presence of two witnesses.

WILLIAM E. TERRY.
EDWIN K. HANLEY.

Witnesses:
J. M. BEERS,
B. J. OLIVER.